United States Patent
Morgan

(10) Patent No.: US 9,169,136 B1
(45) Date of Patent: Oct. 27, 2015

(54) WATER PURIFICATION AND SOFTENING SYSTEM AND METHOD FOR BEVERAGE DISPENSER

(75) Inventor: Robert H. Morgan, Orem, UT (US)

(73) Assignee: WATER EVOLUTION TECHNOLOGIES, INC., Orem, UT (US)

( * ) Notice: Subject to any disclaimer, the term of this patent is extended or adjusted under 35 U.S.C. 154(b) by 474 days.

(21) Appl. No.: 13/526,402

(22) Filed: Jun. 18, 2012

Related U.S. Application Data

(60) Provisional application No. 61/497,597, filed on Jun. 16, 2011.

(51) Int. Cl.
*C02F 1/42* (2006.01)
*A23L 2/54* (2006.01)

(52) U.S. Cl.
CPC .... *C02F 1/42* (2013.01); *A23L 2/54* (2013.01)

(58) Field of Classification Search
CPC ..................................... C02F 1/42; A23L 2/54
USPC .......... 210/669, 683, 685–687, 748.1, 748.14
See application file for complete search history.

(56) References Cited

U.S. PATENT DOCUMENTS

| | | | | |
|---|---|---|---|---|
| 2,071,990 A | * | 2/1937 | Tiger | 426/231 |
| 2,861,689 A | * | 11/1958 | Lyall | 210/175 |
| 3,855,914 A | * | 12/1974 | Nishino et al. | 99/275 |
| 6,241,893 B1 | * | 6/2001 | Levy | 210/660 |
| 6,272,770 B1 | * | 8/2001 | Slutsky et al. | 34/596 |
| 6,565,749 B1 | * | 5/2003 | Hou et al. | 210/500.38 |
| 2004/0154996 A1 | * | 8/2004 | Marmo et al. | 210/754 |
| 2008/0173595 A1 | * | 7/2008 | Lim et al. | 210/806 |
| 2010/0314331 A1 | * | 12/2010 | Poeschl | 210/748.03 |
| 2011/0283952 A1 | * | 11/2011 | Bruer et al. | 119/448 |
| 2012/0091068 A1 | * | 4/2012 | Patcas et al. | 210/748.14 |

FOREIGN PATENT DOCUMENTS

GB        455465        * 10/1936

OTHER PUBLICATIONS

CCNA Base Filtration Water Treatment Unit Specification, Coca-Cola Refreshments Dispensing Operations, copyright 2010.
Lancer Installation and Service Manual for Turbo-Carb High Capacity Carbonator; Jan. 19, 2001.
Memo regarding Requirements for Fountain Dispensing Systems.

* cited by examiner

*Primary Examiner* — Chester Barry
(74) *Attorney, Agent, or Firm* — Parsons Behle & Latimer

(57) ABSTRACT

A water purification and softening system includes a water softening system, connected to a water supply, a temperature stabilization unit, connected to the water softening system, and a dispenser, connected to the temperature stabilization unit. The temperature stabilization unit is configured to adjust a temperature of the softened water to a range of 32° F. to 65° F., and the dispenser is configured to dispense the water. The water can also be carbonated.

19 Claims, 2 Drawing Sheets

WATER PURIFICATION AND SOFTENING SYSTEM AND METHOD FOR BEVERAGE DISPENSER

PRIORITY CLAIM

The present application claims priority from U.S. Provisional Patent Application Ser. No. 61/497,597, filed on Jun. 16, 2011 and entitled WATER PURIFICATION AND SOFTENING SYSTEM AND METHOD FOR BEVERAGE DISPENSER, the disclosure of which is incorporated herein by reference in its entirety.

BACKGROUND

1. Field of the Invention

The present disclosure relates generally to water supplies for the food and beverage service industry. More particularly, the present system and method provides a softened water product that can be carbonated and dispensed through a beverage dispenser, such as a soda fountain.

2. Related Art

The statements in this section merely provide background information related to the present disclosure and may not constitute prior art.

In the food service, hospitality and related industries, a variety of water treatment and filtration systems have been developed and employed for many years. Companies such as U.S. Filter and Culligan have been leaders in the market for water filtration systems. For example, Culligan developed the Everpure® Water Filter System which is now used by Coca Cola® for their fountain beverage systems.

One aspect of water treatment that has gained much attention in recent years is water softening. Water softening removes minerals from water, and thus by itself provides a certain type of water purification. It is well known that soft water helps to reduce scale and mineral buildup in plumbing fixtures, pipes and appliances, for example, and is advantageous for use with soaps and detergents. However, soft water is generally not used for cooking or drinking purposes, and, more particularly, is not used for carbonated beverages for two primary reasons: (1) poor taste due to salt contamination, and (2) soft water is believed not to carbonate acceptably, predictably, or stably. For example, one leading manufacturer of carbonators and soda fountain dispensing machines specifically states in its carbonator manual that soft water is not acceptable for use in a fountain drink machine because it causes over-foaming of the beverage.

It is desirable to have consistent output quality in food and beverage water dispensing systems. Unfortunately, poorly designed and inefficient plumbing systems can hinder this objective and hinder the delivery of consistent quality water. For example, backflow from hot water heaters can introduce undesirable taste and smell into the feed water supply and compromise product quality. The present disclosure is directed toward one or more of the above-mentioned issues.

SUMMARY

In accordance with one embodiment, the present disclosure provides a water purification and softening system that includes a water softening system, connected to a water supply, a temperature stabilization unit, connected to the water softening system, and a dispenser, connected to the temperature stabilization unit. The temperature stabilization unit is configured to adjust a temperature of the softened water to a range of 32° F. to 65° F., and the dispenser is configured to dispense the water. The water can also be carbonated.

In accordance with another embodiment, the present disclosure provides a beverage dispensing system, including a water softening system, connected to a water supply, a temperature stabilization unit, connected to the water softening system, a carbonation unit, configured to carbonate the water, and a fountain drink dispenser, connected to the temperature stabilization unit, configured to mix the carbonated water with drink syrup and dispense a beverage. The temperature stabilization unit is configured to adjust a temperature of the softened water to a range of 32° F. to 50° F.

In accordance with yet another embodiment, the present disclosure provides a method for dispensing softened water, including receiving water from a water supply source, softening the water through ion exchange, stabilizing the temperature of the water to within a range of 32° F. to 65° F., and dispensing the water.

The features, functions and advantages that have been discussed can be achieved independently in various embodiments or may be combined in yet other embodiments, further details of which can be seen with reference to the following description and drawings.

BRIEF DESCRIPTION OF THE DRAWINGS

Additional features and advantages of the inventions will be apparent from the detailed description which follows, taken in conjunction with the accompanying drawings, which together illustrate, by way of example, features of the system and method components.

DETAILED DESCRIPTION

Figure 1:
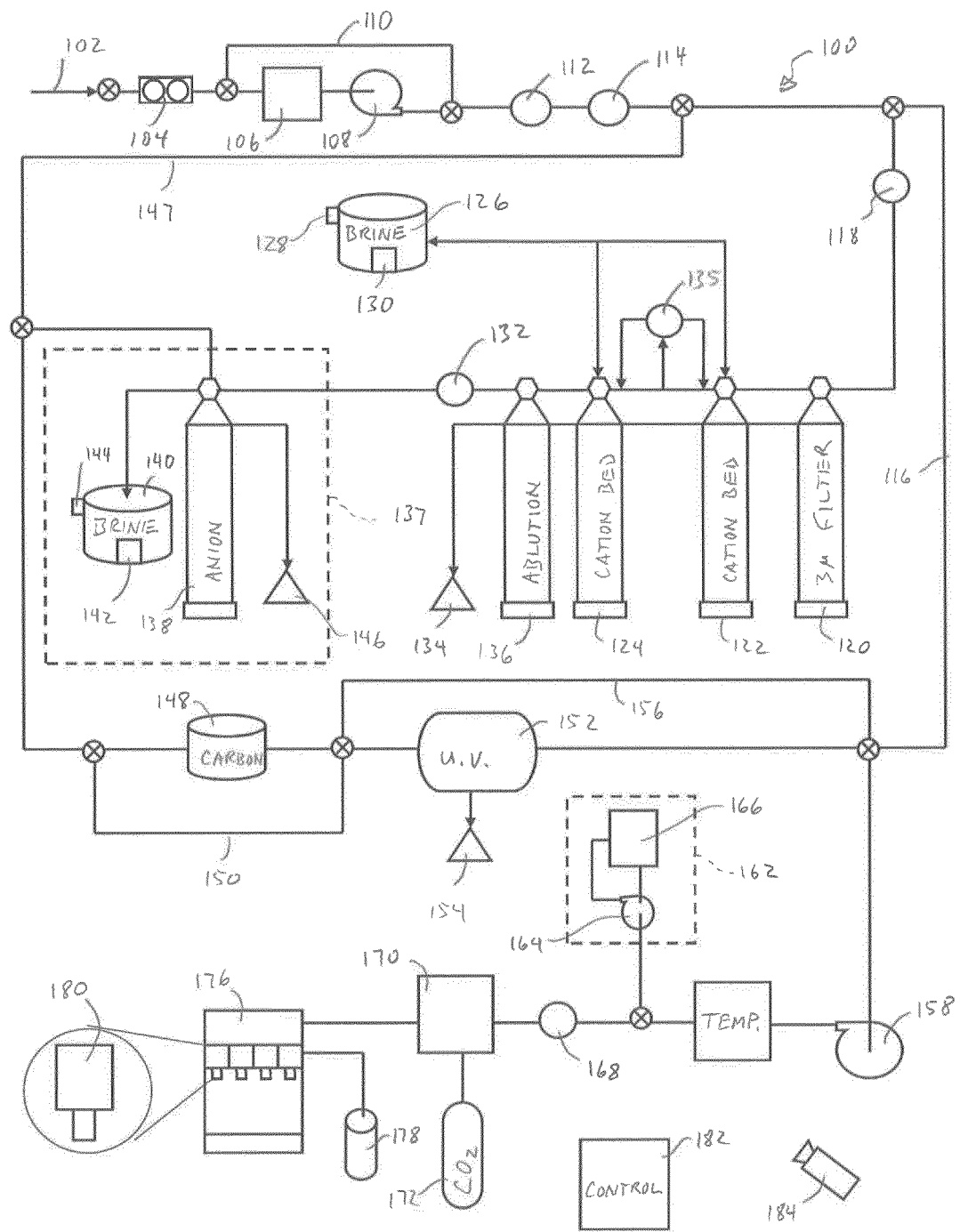
FIG. 1 is a schematic diagram of one embodiment of a water softening and purification system in accordance with the present disclosure.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one, skilled in the relevant art and having possession of this disclosure, are to be considered within the scope of the invention.

Further aspects and advantages of the various embodiments will become apparent from consideration of the following description and drawings. These embodiments are described in sufficient detail to enable those skilled in the art to practice the invention, and it is to be understood that modifications to the various disclosed embodiments can be made, and other embodiments can be utilized, without departing from the spirit and scope of the present invention. The following detailed description is, therefore, not to be taken in a limiting sense.

It is considered desirable to stabilize the many variables that can influence the quality of water supplies, particularly to the food and beverage industry. There is wide variability in the character and quality of water provided by municipal and private water suppliers. The number of factors affecting water quality is not insignificant and can include: dissolved minerals and suspended organic particles from natural sources;

industrial and agricultural contamination that can include inorganic pollutants, pesticides, organic compounds, petroleum waste and heavy metal industrial by-products; turbidity from flooding and runoff; particulate matter and contaminants from construction and repair projects; infiltration of contaminants from poorly-maintained infrastructure or corroded and aged piping; and variations in the types and methods of chemical treatments (e.g. chlorine) that are used by water providers to make their water supplies potable. These many factors make the management of water systems an ever-changing, varied, and complex process whose outcome can fluctuate dramatically from day to day as a system's available water sources change between multiple wells, storage tanks or water lines. Moreover, these variables differ from region to region as well as from season to season.

Bacteria can also gain access into potable water supplies through porous, aged or broken metal or wood piping; by backflow from downstream systems; by contamination from animals; and by the misapplication of treatment chemicals. For example, *giardia* and *cryptosporidium* are not killed by chlorination because they have a protective mucous membrane shielding them from the toxic effects of chlorine. The challenges presented by multiple and fluctuating municipal water sources and random contaminants can be further compounded by variable chemical water treatment and irregular treatment patterns. Chemicals like chlorine are not true purifiers. Instead, they are bactericides or pesticides. It is also believed that these chemicals and their byproducts may create carcinogens, which can have long-term exposure risks to the public, such as for cancer, etc.

To address at least some of these water quality issues, it has been recognized as desirable to provide a process that can provide consistent high-volume, all-inclusive, low cost treated water to the food and beverage industry. Fountain drink syrup providers, such as Coca Cola® U.S.A. and Lancer®, recommend using ambient cold, hard, un-softened water for soda fountain service. For this reason, food and beverage vendors often over-flavor drinks with excess syrup in an effort to mask the distasteful effects of inorganic minerals, pollutants and municipal water treatment chemicals. Contrary to syrup provider recommendations, however, the system and method disclosed herein produces high-volume clear purified water with significantly reduced corrosive inorganic mineral content, allowing food and beverage vendors to capture previously unidentified soda fountain profits by using less syrup. The system and method disclosed herein provides a process that can take essentially any water input source—e.g. municipal water supply, private wells, reservoirs, cisterns, lakes, or any other water collection method—and provide filtration, purification and mineral control to stabilize the quality of water output.

Provided in FIG. 1 is a schematic diagram of one embodiment of a water filtration and softening system 100 in accordance with the present disclosure. This diagram shows the component arrangement and associated plumbing controls and monitoring systems beginning from a water supply line 102 and proceeding on through a series of stages of water filtration, ion exchange (i.e. softening), purification, temperature stabilization and optional carbonation to provide precision dispensing of a reduced mineral water beverage. A number of valves are shown in this system 100, and interconnect various water lines and pipes. Those of skill in the art will be able to determine the type, size and location for valves in this system, and valve configurations different from that shown can be used. It is also to be appreciated that some of the elements shown in the diagram of FIG. 1 can be considered optional, and may not be present in all embodiments of this system, as discussed below. For example, several bypass lines are shown and described below, by which the water supply can be caused to bypass certain elements or groups of elements in the system. However, it is to be appreciated that other bypass arrangements can also be used, if desired.

Beginning at the water supply line 102, water proceeds first through a double check valve 104. The water supply is presumed to be the water supply to the facility where the system is to be installed, and can be from a municipal water system, a private water well, etc. The double check valve 104 is a device that is typically specified by municipal water authorities for facilities serving and preparing food products. This valve is located in line before the subsequent elements of the water treatment system 100 in order to avoid possible back flow of water into the municipal water supply system.

Following the double check valve 104, water can flow through a chlorination unit 106. This is an optional unit that can be provided if the water supply is not already treated by a municipality or other service provider. For example, chlorination may be desirable where the water supply is from a private well. Following the chlorination unit 106, a booster pump 108 can be provided to stabilize the incoming water pressure. This can be desirable in areas where the inflowing water is at pressures too low for the ion exchange system (described below) to function at desired levels. Where chlorination is not desired, the chlorination unit 106 and booster pump 108 can be bypassed via line 110.

The water supply can next flow through a pressure regulator 112, which helps to regulate the inflow pressure so that it does not exceed specifications, and a check valve/swing gate 114, which ensures that there is no back flow to the water source and to help prevent undesired pressure conditions for subsequent elements in the system. For example, undesired pressure conditions (either over- or under-pressure) can cause fiberglass cylinders to collapse, leak or burst due to unexpected random back pressure occurrences.

If the supply water is considered suitable without treatment, or if there is some malfunction in the treatment system, valves can be arranged to cause the water to flow through bypass line 116 directly to the temperature control and carbonation systems 160, 170. However, this is typically not the case. Ordinarily, water will first flow through a pressure gauge & sample port 118, which allows operations personnel to check input pressure in order to ensure that input pressures are adequate to for desired operation of the treatment apparatus, as described below.

The first treatment element of the system is a filter aggregate or aggregate plus unit 120. In one embodiment, this unit includes filter media of the type that is used for water treatment plant applications, and can contain aggregate in a cylinder that is designed to capture any particulate matter that may be suspended in the incoming water stream. This filter can be configured to trap particulate matter that is from 20 microns down to 3 microns in size. This reduces water turbidity and helps eliminate particulate matter that may allow microbes to "hitchhike" into the system and hide from the UV light reactor unit 152 or negatively affect the efficiency of other downstream system functions. In particular, turbidity and particulate matter can affect operation of the carbonation unit(s) 170 and the metering valves 180 of the dispenser unit 176.

Next, the source water flows through a pair of cation resin beds 122, 124 that contain ion exchange resins. These cation resin beds can be charged with sodium ions from a first brine tank 126 during a regeneration cycle. The regeneration cycle, which is controlled by the units' control valves, sends brine that is charged with sodium ions from the Brine Tank 126 to recharge the resin beds with negative sodium ions. Once the resin bed is regenerated, the control valve will dump the effluent from the regeneration to a drain 134. After dumping effluent, the control valves will allow source water to flow through the resin beds in the cylinders. As the water flows through the resin, the positively charged mineral ions in the water will exchange places with the negatively charged sodium ions attached to the resin. This will not only remove non-nutritional inorganic minerals such as inorganic calcium (which is similar to what makes up kidney stones), but also lime, magnesium, iron, and even lead from the incoming water stream, thereby producing a safer reduced mineral water.

In one embodiment, the first and second cat ion resin beds 122, 124 can each be an 8" or larger diameter fiberglass cylinder with a 4" threaded neck and an included control valve. One suitable product for the cation resin bed cylinders 122, 124 is the Purolite® SST high efficiency resin, utilizing shallow shell technology. The control valve for each resin bed can be a piston-type water softener control valve, such as are available from the Clack Corporation of Windsor, Wis. A motorized alternating valve, such as is also available from Clack Corporation, can be connected to the pair of control valves associated with the cat ion resin beds, in order to alternate use of each resin bed, so that water treatment can continue uninterrupted during regeneration of either one of the resin beds. In resin based ion exchange processes optimization of both the regeneration process and the ion exchange process is benefited by the shortest diffusion path possible. The diffusion path is the distance a molecule will have to travel from the interior of a resin bead to the exterior where it will flow into the water stream. It is the reverse path for the regeneration cycle. The shorter this diffusion path, the more rapidly the ion exchange process occurs. This is particularly desirable during regeneration. Reducing the depth of penetration in order to completely "clean" the resin bead of accumulated minerals allows for a more complete regeneration and provides a higher, more efficient utilization of the regenerant.

It is desirable that the resin beads to have a smooth, highly efficient polished-like surface and inert centers. This is in contrast to conventional soft water resins, which tend to have dimples, craters and crevices that can penetrate deep into the resin sphere. These craters and crevices can trap salt and prevent the sodium ions from exchanging places with the mineral ions efficiently during the exchange cycle. These surface irregularities can also inhibit complete regeneration with sodium ions during the regeneration cycle. Instead, where only the outer shell of the resin beads is functionalized, the diffusion path is shortened and the resins can perform with high sodium ion exchange efficiency, lower leakage, and reduced rinse water requirements. Suitable resin bead systems can regenerate using about 50% less water and rinse very quickly to high quality operation. When compared to conventional softening resins, regenerant reductions of 2 to 4 lbs. per cubic foot of resin per regeneration are possible without sacrificing capacity or increasing leakage. Such reductions can translate to salt savings of 700 to 1,400 lbs. per cubic foot of resin per year based on daily regenerations. These types of resins also exhibit good toughness and durability and resistance to osmotic shock versus conventional resins. By using resins with smooth, highly efficient polished-like surfaces and no craters or cracks, the system reduces the problem of uncontrolled release of residual salt or other contaminants to down stream system components and ultimately to end users.

The brine tank 126 contains a supply of salt that is kept in a water solution at a high concentration. The brine tank 126 can include a thermostatically controlled heater 130 for controlling water temperature, in view of site-specific conditions. The water is heated from variable ambient temperatures to a desired temperature in order to capture a higher concentration of salt in solution. This can promote high salt use efficiency for brine solution and regeneration. The control valves associated with the tanks 120-124 draw this brine solution into the ion resin beds 122, 124 when the regeneration cycle starts.

The brine tank 126 can also include a brine tank salt level monitor 128, which is part of the control system, and operates to detect when salt levels are low in the brine tank and send a warning signal. Workers can then refill the brine tank with the correct salt. This is a desirable component of the monitoring and control system because a common cause of substandard performance in ion exchange water treatment systems is the failure to maintain adequate salt levels in the Brine Tank.

An alternating clack control valve 135 allows the system to switch between the two cation resin beds 122, 124 as needed to optimize the operation of the system. This allows the system to ensure that there is always an uninterrupted supply of high quality water. In a food service application, a single cylinder water softening system can introduce hard water or brine into the output flow when the system is in the regeneration cycle during a period of heavy demand due to the valve design in many conventional soft water control valves. The clack control valve 135 helps reduce brine piston failure and downstream brine water contamination.

Additionally, a pressure sensor 132 can be provided in the water lines adjacent to the cation resin beds 122, 124 to signal the control system when inadequate pressure is occurring during the regeneration cycle. It is possible for brine solution to enter downstream system components and into the beverages served from the system if adequate pressure is lost during the regeneration cycle. This sensor 132 will assist the system in correcting itself in the event of pressure loss.

The water softening system also includes an ablution unit 136, which helps to remove chlorine and various size physical and sediment impurities from the water, and also provides a bacteriostatic medium and acts to assist in raising the pH level of the treated water. This helps reduce potentially high volumes of chlorine that may have been introduced into the water from municipal chlorine flushing. In one embodiment, the ablution unit can include an 8" or larger fiberglass cylinder with a clack control valve and containing a gravel bed, a 3" layer of KDF®, and an activated carbon medium derived from coconut fiber. The coconut carbon helps stimulates adsorption and catalytic oxidation to remove chlorine and sediment. The KDF material is a high purity copper/zinc alloy, and serves as the bacteriostatic medium. Overall, the ablution unit 136 helps provide a safer flow of clear, clean processed water with reduced chlorine, low turbidity, and a reduction or elimination of any unpleasant taste or odor. Effluent from the filter cylinder 120, the cation exchange resin beds 122, 124, and the ablution unit 136 is carried to a drain 134 in the facility for disposal.

The water purification and softening system 100 can also optionally include an anion resin bed unit 137 to remove negatively charged ions such as arsenates and nitrates. This unit includes an anion resin bed 138 and brine tank 140. The anion resin bed 138 contains positively charged resins that can remove negatively charged ions from the inflowing water stream, such as arsenates, nitrates, sulfides, sulfates, etc. The brine tank 140 is similar to brine tank 126, and can include a thermostatically controlled heater 142 for controlling water temperature as discussed above, and a Brine Tank Salt Level Monitor 144, also discussed above. Effluent from the anion resin bed 138 can be carried to a drain 146.

The water softening steps described above can effectively remove minerals and other undesired constituents from the water without lowering the pH of (i.e. acidifying) the water. Reverse osmosis and other water softening processes can lower the pH of water, making the water more acidic and aggressive, which can cause damage to pipes, valves, and other water system components. This system and method, on the other hand, can remove minerals, etc. without substantially lowering the pH, and may actually raise the pH of the water by as much as two points or more. The result is a more alkaline water than is produced by other methods. It has been found that the softened, filtered water produced by this method can have a pH in the range of up to 8 or 9, depending on the pH of the initial water supply.

If desired, the ion exchange and ablution water treatment steps described above can be bypassed via line 147. This can be done to allow the system to continue operation during maintenance or malfunction, or if the supply water is considered suitable without those treatment steps. Following the ion exchange and ablution steps, the water can flow through a high-volume/low-pressure loss carbon block filter 148, that can add another filtration step to remove the smallest particles that may have passed through the aggregate filter 120 and been transported to this point in the water treatment system 100. In one embodiment, the carbon block filter 148 can remove particles down to 5 microns in size, and can also help remove any tastes or odors, as well as capture particles that may shelter living organisms from being fully exposed during the UV treatment process, described below. The carbon block filter can also help remove chlorine from the water. The carbon block filter can be bypassed via line 150, if desired.

Following the carbon block filter 148, the water can pass through a UV light reactor unit 152, which will subject the entire water stream to intense UV radiation in order to kill microbes within the water. Such treatment can kill bacterium, fungi and viruses. In one embodiment, the UV reactor unit can be selected to meet U.S. Pharmacopeia standards for purification. Such devices are commercially available in various form factors and at costs that are considered low enough to justify utilization in facilities that process or prepare food and beverages at lower volumes. The inclusion of a UV treatment device 152 can also possibly provide immunity from "boil water" orders that sometimes are issued during or after municipal water system damage or repairs that sometimes can introduce contaminants into the water system. Such situations can cause a significant loss of business for food service businesses, and can require cleaning and sterilization of the entire food service water distribution system. The UV treatment device 152 can also include an effluent drain connection 154. As with the carbon filter 148, the UV treatment system 152 can also be bypassed via line 156, if desired.

After the incoming water is treated, filtered and purified, a desired pressure can be restored via a booster pump 158. This allows provision of the appropriate pressure for facility equipment such as ice makers, dishwashing machines, etc. The temperature of the water can then be adjusted to the desired level in a temperature stabilizer unit 160. This can be a thermostatically controlled unit that stabilizes and maintains desired water temperature for site-specific and vendor-chosen purposes. Such units are commercially available. Where water is to be carbonated, a particular temperature range can be considered desirable for good results. Generally speaking, it is desirable to have a lower temperature for carbonation. However, water softening is more effective at higher temperatures. Consequently, the water softening and treatment steps discussed above can tend to increase the temperature of the water above a desirable level for carbonation. Additionally, the initial temperature of the water supply may be above the desired level for carbonation. Thus, the temperature stabilizer unit can operate to lower the water temperature from a level that is effective for softening, to a level that is more suitable for effective carbonation. This carbonation temperature range can be from about 32° F. to about 65° F., and more particularly from about 32° F. to about 50° F. A temperature below about 50° F. is considered desirable, and a specific target temperature of 42° F. has been used with good results. Carbonation within the desired temperature range helps to prevent foaming of the carbonated beverage.

Following temperature stabilization, water can be delivered to an optional purified water dispenser unit 162. This unit can be configured for vending water in a variety of ways, such as for filling individual water supply bottles, or for filling large (e.g. five gallon) water containers for transport to water dispensers. This allows customers to fill empty containers with the highly reduced mineral purified water from the system at the output temperature of the temperature stabilization unit (e.g. below 42° F.). The purified water dispenser unit 162 can be a free-standing or wall-mounted unit, and can be coin operated. It can be placed inside or outside of a commercial facility for access by customers, or for general use by employees within a business, school, etc. The purified water dispenser unit 162 includes a recirculation pump 164 for pumping the temperature-controlled water to the water dispenser 166, and recirculating the water therein.

The water next passes through a pressure regulator 168 which helps to ensure that operators are aware that the system is feeding water at the desired site-specific pressure (e.g. 50 psi) from the booster pump 158. From that point the water is delivered to the carbonation unit 170, which mixes the temperature stabilized water from the system, now with substantially reduced abrasive mineral content, with $CO_2$ from the pressurized $CO_2$ tank 172 to blend it for dispensing via the fountain drink dispenser unit 176. The carbonation unit 170 helps ensure that soft drinks delivered by the system will have a desired level of $CO_2$ concentration.

The fountain drink dispenser unit 176 is also attached to one or more syrup tanks 178, which provide flavoring for the fountain drinks. Mixing of the drink syrup with the carbonated, purified water is accomplished at the fountain drink dispenser unit metering valves 180. Multiple fountain drink dispenser units 176 can be associated with a single water purification system 100, and each fountain drink dispenser unit can dispense purified carbonated water along with syrup-flavored water to provide carbonated soft drinks for serving to customers.

The desired level of carbonation and flavoring of fountain drinks can be determined by the user. Temperature control via the temperature control unit 160 helps ensure efficient operation of the fountain drink dispenser unit 176, and aids in the reduction of syrup and $CO_2$ usage while maintaining the quality of soft drinks dispensed by the fountain drink dispenser unit 176.

The fountain drink dispenser unit metering valves 180 can be a lever- and solenoid-activated valve that meters very precise proportions of carbonated system-treated water and syrup flavoring into a container to be served to a customer. Research has shown that some valves of this type demonstrate consistent performance within acceptable tolerances. A highly accurate metering valve 180 can allow the reduced-mineral purified water from this system 100 to be set to a very precise ratio of syrup-to-water for a significant length of time (e.g. up to a year). Many drink metering valves do not consistently perform very well. A highly accurate metering valve, on the other hand, allows the water treatment system 100 to consistently deliver controlled carbonated soft drinks with precisely measured and optimized syrup/water ratios that are different (i.e. lower) from the standards recommend by the national syrup providers, allowing the use of less syrup and thus providing a significant cost savings.

Suitable fountain drink dispenser unit metering valves that are commercially available include the LEV, FS and LFCV adjustable ratio metering valves available from the Lancer Corporation of San Antonio, Tex. The Lancer metering valves have a ratio setting feature that allows highly accurate setting of the water-to-syrup ratio for fountain drinks. The water filtering and purification steps described above contribute to the effectiveness of the metering valve. With reduction or removal of the inorganic mineral content of the water, and its abrasive and corrosive effects on the valve, along with removal of chlorine, which deteriorates valve seals, and the lubricating effects on the moving valve parts (whether metal or plastic) of the sodium ions in the treated water, this particular type of valve appears to perform even better than it does with untreated water or water treated in other ways.

The entire water treatment system 100 can be controlled by a system controller 182, which can be designed to control and monitor the condition of the system components and their operational parameters. The controller 182 can be a computer device that includes a processor and system memory, and is provided with software for monitoring and controlling the various system components. While not shown, it is to be understood that the various system components can be interconnected to the controller 182 via hard-wired connections, wireless connections, etc. The controller can be configured to report on the system status and efficiency, and to submit alarms to different configurable communication channels in the event a condition arises that needs attention from maintenance or operations. A camera 184 can also be interconnected to the system controller and oriented for conducting remote systems inspection and providing technical assistance to onsite personnel, as well as for security purposes.

The controller 182 can be connected to sensors and other elements associated with the system 100 for monitoring conductivity, pH, turbidity, relative humidity, barometric pressure, salinity, physical salt level, bubble detection, air flow, signaling, and controlling the system's hardware, water flow, syrup metering, temperature, pressure and total dissolved solids (TDS) in order to characterize and report the level of operation of the system. Other sensors can be used and other parameters can be sensed, if desired. While these sensors are not specifically shown in the drawings, one of skill in the art will be able to place desired sensors at suitable points in the system as determined by site location demands and installation requirements.

Figure 2:
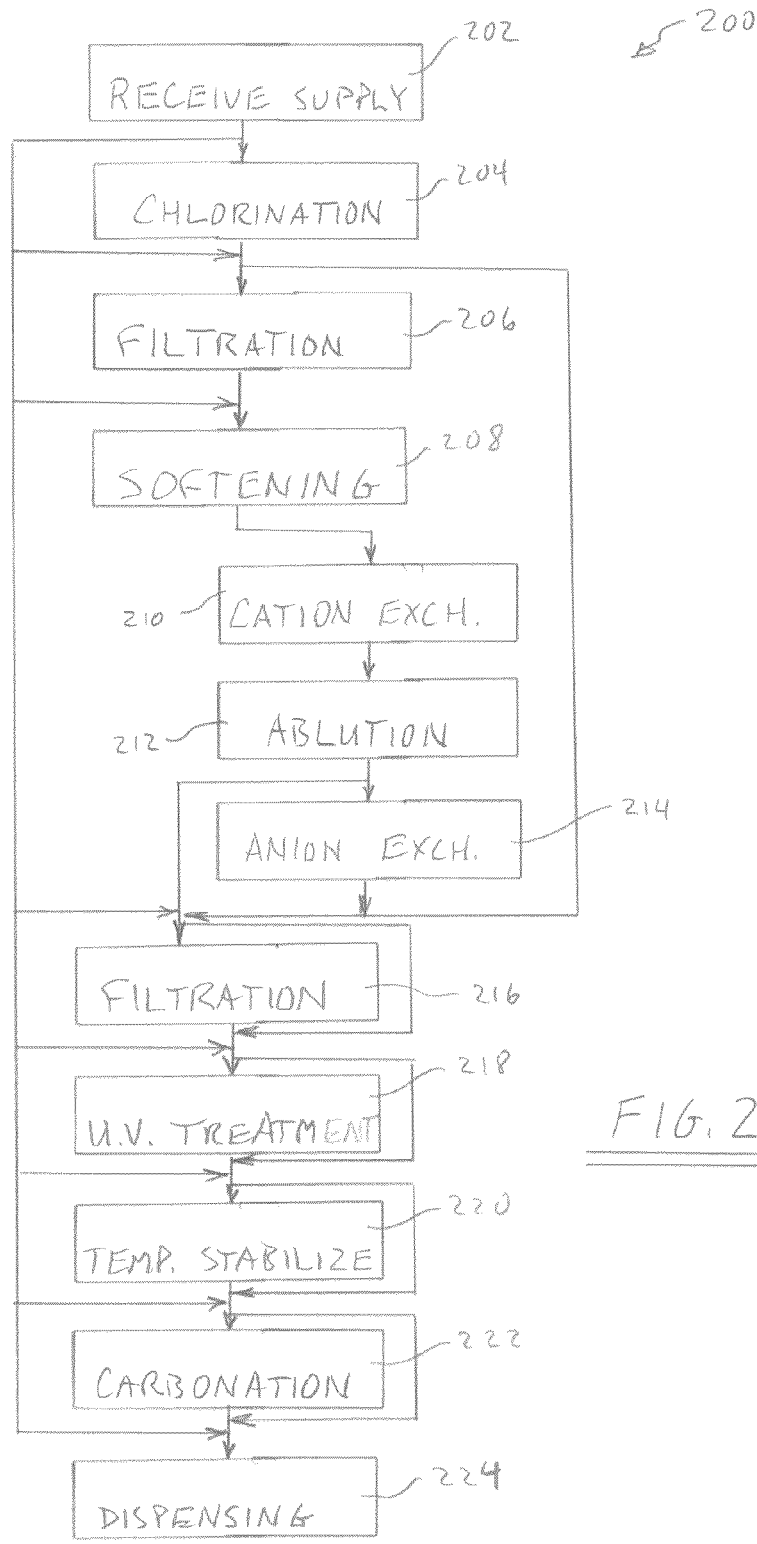
FIG. 2 is a block diagram outlining the steps in an embodiment of a method for water purification and softening in accordance with the present disclosure.

A block diagram outlining the steps in an embodiment of a method 200 for water purification and softening in accordance with the present disclosure is provided in FIG. 2. The method generally involves receiving supply water 202, softening the water 208, stabilizing the temperature of the water 220, then carbonating the water 222 and dispensing it 224. The various arrows in this figure show how various steps and substeps that can be used in various embodiments, but are in some cases optional. After receiving the supply water 202, the water can be chlorinated 204 and then filtered 206. Following filtration, softening of the water can include the steps of cation exchange 210, ablution 212 and anion exchange, as discussed above.

Following water softening, the water can then be filtered again 216, subjected to UV treatment 218, and then temperature stabilized 220 before carbonation and dispensing. It is to be understood that the order of these steps can be varied from that shown in FIG. 2, and various steps can be eliminated in various embodiments. For example, dispensing 224 can occur in the absence of carbonation, so as to provide purified, filtered water drink. Additionally, dispensing 224 can also include mixing with drink syrup for fountain drinks, as discussed above.

The system and method disclosed herein thus provides a multi-stage design that allows vendors a new water product designed to avoid using untreated sources of ambient cold, hard, un-softened water for soda fountain service. The system efficiently produces high-volume clear purified water with significantly reduced corrosive inorganic mineral content, allowing food and beverage vendors to capture previously unidentified soda fountain profits by eliminating the need to over-flavor drinks with excess syrup in an effort to mask the distasteful effects of inorganic minerals, pollutants and municipal water treatment chemicals. Advantageously, this is done without introducing residual salt contamination from inefficient traditional soft water industry valves, pistons, and ion exchange resins.

The system and method disclosed herein uses only sodium chloride, as opposed to potassium chloride, for its ion exchange process. The sodium ions create a sweet-tasting, very low sodium water beverage. Research gives positive support for sodium-enhanced beverages as an electrolyte that is nutritionally utilized. Stabilized temperatures insure consistent carbonation qualities to minimize or eliminate water supply source and unhelpful plumbing temperature variables throughout multiple sites. This system and method integrates multiple filtration methods, a high-efficiency ion exchange resin and an alternating control valve, which together help prevent brine contamination of the outflow water which occurs with conventional soft water systems.

The system and method disclosed herein produces slightly alkaline water, which is believed to have positive health benefits by aiding the absorption of oxygen into the water rather than repelling or expelling oxygen from the water. This system and method overcomes the generally poor carbonation characteristics of softened water by carefully controlling water temperature, and provides good carbonation, without over-foaming. This system and method also overcomes or reduces some typical systematic technical limitations of soft water systems, such as the possibility of mechanical failures due to corrosion of valve components, resin surface imperfections and inefficiencies, unstable temperature controls, inefficient brine concentrations, poor flow designs, inadequate filtration, and poor purification capabilities. All of these possible limitations of other systems can contribute to poor water quality, unstable water quality, unstable temperature management, and potentially uncontrolled release of salt into the final downstream water product. The treated water can also provide valve lubricating capability, thus promoting valve reliability and component longevity.

The water that is produced from this system and method is designed to be an all-inclusive water product that provides healthier support and safety with low costs. The high-efficiency component design produces a sweet-tasting water, combined with reliable temperature control and metering hardware to ensure precision syrup-to-water ratios for food and beverage preparation, including high quality soft drinks, ice making, and drinking. The total combined system and method is believed to promote lower water-related food service equipment maintenance costs, along with higher profits due to higher efficiencies and a syrup-use offset, with increased sweeter water and empirically measurable profitability. In fact, it is believed that the water itself may meed FDA standards as a very low sodium beverage, which may provide a variety of health benefits. In turn, the system and method disclosed herein also produces new fountain beverage products due to optimized syrup-to-water ratios, which can increase the food and beverage producer's profitability.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A water purification and softening system, comprising:
   a sodium chloride-based ion exchange water softening system, connected to a water supply;
   a temperature stabilization unit, connected to the water softening system, configured to adjust a temperature of the softened water to a range of 32° F. to 65° F.;
   a carbonation system, configured to carbonate at least some of the softened and temperature-stabilized water; and
   a dispenser, connected to the temperature stabilization unit and the carbonation system, configured to dispense the carbonated water.

2. A water purification and softening system in accordance with claim 1, further comprising a chlorination unit, connected between the water supply and the water softening system, configured to chlorinate the water prior to softening the water.

3. A water purification and softening system in accordance with claim 1, further comprising at least one filtration unit, configured to remove from the water at least one of chlorine, particulate matter, and microorganisms.

4. A water purification and softening system in accordance with claim 3, wherein the at least one filtration unit comprises a first filtration unit positioned ahead of the water softening system, and a second filtration unit positioned after the water softening system.

5. A water purification and softening system in accordance with claim 1, further comprising an ultraviolet treatment unit, configured to expose the water to ultraviolet radiation.

6. A water purification and softening system in accordance with claim 1, wherein the dispenser is a fountain drink dispenser, configured to mix the carbonated water with drink syrup.

7. A water purification and softening system in accordance with claim 1, wherein the water softening system comprises at least one cation resin bed, containing negatively charged ion exchange resin beads, adapted to chemically draw positively charged mineral ions out of the water.

8. A water purification and softening system in accordance with claim 7, wherein the water softening system comprises a pair of cation resin beds, and a control valve, configured to switch between the cation resin beds to prevent interruption of the water treatment.

9. A water purification and softening system in accordance with claim 1, further comprising an anion resin bed, containing positively charged ion exchange resin beads, adapted to chemically draw negatively charged mineral ions out of the water.

10. A beverage dispensing system, comprising:
    a sodium chloride-based ion exchange water softening system, connected to a water supply;
    a temperature stabilization unit, connected to the water softening system, configured to adjust a temperature of the softened water to a range of 32° F. to 50° F.;
    a carbonation unit, configured to carbonate the water; and
    a fountain drink dispenser, connected to the temperature stabilization unit, configured to mix the carbonated water with drink syrup and dispense a beverage.

11. A beverage dispensing system in accordance with claim 10, wherein the water softening system comprises at least one cation resin bed, containing negatively charged ion exchange resin beads, adapted to chemically draw positively charged mineral ions out of the water.

12. A beverage dispensing system in accordance with claim 10, further comprising a first filtration unit positioned ahead of the water softening system, and a second filtration unit positioned after the water softening system.

13. A beverage dispensing system in accordance with claim 10, further comprising an ultraviolet treatment unit, configured to expose the water to ultraviolet radiation.

14. A beverage dispensing system in accordance with claim 10, wherein the fountain drink dispenser comprises a solenoid-actuated metering valve having an adjustable syrup to water ratio.

15. A method for dispensing softened water, comprising:
    receiving water from a water supply source;
    softening the water through ion exchange using sodium chloride;
    stabilizing the temperature of the water to within a range of 32° F. to 65° F.;
    carbonating the water; and
    dispensing the water.

16. A method in accordance with claim 15, further comprising filtering the water.

17. A method in accordance with claim 15, further comprising chlorinating the water.

18. A method in accordance with claim 15, further comprising treating the water with ultraviolet radiation.

19. A method in accordance with claim 15, further comprising combining the carbonated water with drink syrup and dispensing a carbonated fountain drink.

* * * * *